(12) United States Patent
Vanderheijden et al.

(10) Patent No.: US 8,798,135 B2
(45) Date of Patent: *Aug. 5, 2014

(54) VIDEO STREAM MODIFIER

(71) Applicant: Entropic Communications, Inc., San Diego, CA (US)

(72) Inventors: Geert Vanderheijden, Haaren (NL); Hans Tichelaar, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/661,778

(22) Filed: Oct. 26, 2012

(65) Prior Publication Data

US 2013/0287096 A1 Oct. 31, 2013

Related U.S. Application Data

(62) Division of application No. 11/722,557, filed on May 15, 2008, now Pat. No. 8,363,714.

(30) Foreign Application Priority Data

Dec. 22, 2004 (EP) .................................... 04106886

(51) Int. Cl.
  *H04N 7/12* (2006.01)
(52) U.S. Cl.
  USPC ................................. 375/240.01; 375/240.24
(58) Field of Classification Search
  None
  See application file for complete search history.

(56) References Cited

U.S. PATENT DOCUMENTS

| | | | |
|---|---|---|---|
| 5,917,947 A * | 6/1999 | Ishida et al. | 382/232 |
| RE37,091 E | 3/2001 | Tanaka et al. | |
| 6,452,973 B1 | 9/2002 | Hwang | |
| 6,473,463 B2 | 10/2002 | Agarwal | |
| 6,631,163 B1 | 10/2003 | Peng | |
| 6,996,281 B2 | 2/2006 | Boliek et al. | |

(Continued)

FOREIGN PATENT DOCUMENTS

| | | |
|---|---|---|
| EP | 1248466 A1 | 10/2002 |
| JP | 11-146398 A | 5/1999 |
| JP | 2004514352 | 5/2004 |
| WO | 03067778 A1 | 8/2003 |

OTHER PUBLICATIONS

Ribas-Corbera, J. et al., "Rate Control for Low-Delay Video Communications" ITU Telecommunications Standardization Sector, Jun. 24, 1997, pp. 1-27.

*Primary Examiner* — Phirin Sam
(74) *Attorney, Agent, or Firm* — Richard Bachand; Duane Morris LLP

(57) ABSTRACT

A compressed data stream modifier 270 is disclosed. The stream modifier modifies an input data stream that may comprise audio and video data streams conforming to any one of the well-known video compression standards, for example, MPEG or AVC. The input stream is first de-multiplexed to obtain a single video elementary stream. The video elementary stream is then decoded by means of a variable-length decoder and provided to the data stream modifier. A decoding complexity of each frame is estimated by an estimator 210 and provided to a controller 250. The controller selects a number of regions from each frame based on some psycho-visual criteria, such that a method of modification of these regions can bring the decoding complexity within an available capacity at a decoder. An efficient means of adapting a decoding complexity to an available capacity is thus obtained.

5 Claims, 5 Drawing Sheets

(56) References Cited

U.S. PATENT DOCUMENTS

Figure 1:
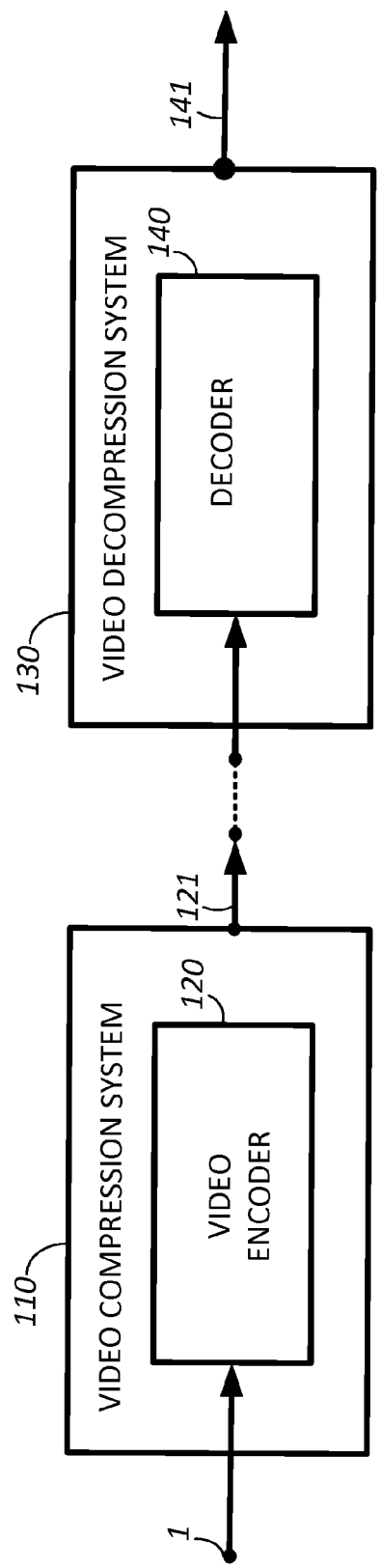

| | | |
|---|---|---|
| 7,292,602 B1 * | 11/2007 | Liu et al. ............... 370/468 |
| 7,496,236 B2 * | 2/2009 | Fogg ..................... 382/233 |
| 2001/0048768 A1 | 12/2001 | Tan |
| 2002/0009141 A1 | 1/2002 | Yamaguchi et al. |
| 2002/0154227 A1 | 10/2002 | Lan et al. |
| 2003/0001964 A1 | 1/2003 | Masukura et al. |
| 2003/0156198 A1 | 8/2003 | Lee |
| 2003/0228063 A1 * | 12/2003 | Nakayama et al. ........ 382/251 |
| 2004/0006644 A1 | 1/2004 | Henocq et al. |
| 2004/0120401 A1 * | 6/2004 | Linzer et al. ........... 375/240.16 |
| 2004/0213349 A1 | 10/2004 | Zador et al. |
| 2004/0228538 A1 | 11/2004 | Onuma et al. |
| 2004/0233990 A1 | 11/2004 | Sekiguchi et al. |
| 2005/0002458 A1 | 1/2005 | Bruls et al. |
| 2005/0018911 A1 | 1/2005 | Deever |
| 2005/0226332 A1 * | 10/2005 | Uetani .................. 375/240.16 |
| 2006/0031917 A1 * | 2/2006 | Winder et al. ............. 725/135 |
| 2006/0251330 A1 * | 11/2006 | Toth et al. ................ 382/236 |
| 2007/0005795 A1 | 1/2007 | Gonzalez |
| 2007/0201563 A1 * | 8/2007 | Yamaguchi et al. ..... 375/240.26 |
| 2012/0155541 A1 * | 6/2012 | Kumar et al. .......... 375/240.16 |
| 2013/0188742 A1 * | 7/2013 | Raveendran et al. .... 375/240.26 |

\* cited by examiner

VIDEO STREAM MODIFIER

This application is a divisional of U.S. patent application Ser. No. 11/722,557, filed on May 15, 2008 and is a 371 National Phase of PCT patent application no. PCT/IB2005/054316, filed Dec. 19, 2005, and claims benefit/priority of European patent application no. 04106886.7, filed Dec. 22, 2004, the contents of each of which are hereby incorporated by reference as if set forth in their entireties.

The invention relates to a device for modifying a compressed data stream to be decoded at a decoder, the compressed data stream being obtained by encoding a sequence of pictures comprising regions of pixels, the device comprising:

estimating means for estimating a decoding complexity required for decoding a picture from the compressed data stream; and modifying means for modifying the compressed data stream when the decoding complexity of the picture approaches a capacity of the decoder.

The invention further relates to a video-processing system for compression and decompression of a sequence of pictures comprising such a device.

The invention further relates to a video-processing apparatus comprising such a device.

The invention further relates to a method of modifying a compressed data stream to be decoded at a decoder, the compressed data stream being obtained by encoding a sequence of pictures comprising regions of pixels, the method comprising the steps of estimating a decoding complexity required for decoding a picture from the compressed data stream; and modifying the stream when the decoding complexity of the picture approaches a capacity of the decoder.

The invention further relates to a computer program product comprising a code enabling a processor to execute a method of modifying a compressed data stream to be decoded at a decoder, the compressed data stream being obtained by encoding a sequence of pictures comprising regions of pixels, the product comprising:

a code for estimating a decoding complexity required for decoding a picture from the compressed data stream; and a code for modifying the stream when the decoding complexity of the picture approaches a capacity of the decoder.

Video information, typically comprising a sequence of picture frames, can be compressed to form a digital data stream for storage and transmission. Some of the compression standards that have attained widespread use for compressing and decompressing video information are the Moving Pictures Expert Group (MPEG) Standards for video encoding and decoding, in particular MPEG-2. MPEG Standards are used for various applications of storage, transmission and display of video information, such as optical storage systems, digital versatile disc (DVD) technology, and digital television (DTV) broadcasts. While decoding a MPEG data stream, the decoding complexity may vary from frame to frame. It may occur that the decoding complexity is higher than a capacity available at a decoder, as a decoder might generally not be equipped to deal with peak loads. In such cases, the decoder will be unable to decode the complete picture. Consequently, the output picture may abruptly suffer from quality degradation. In order to adapt the decoding complexity of a compressed data stream of video information to the available capacity at a decoder and to obtain an optimum picture quality at the output, several solutions have been suggested in the prior art.

A method and system for decoding a stream of video data with a modified decoding process at the decoder resulting in a dynamic adaptation of complexity is known from U.S. Pat. No. 6,631,163. This patent describes a method of dynamically setting a threshold value for a scalable module within a MPEG-2 video decoder system. One of the embodiments of this prior art comprises a scaling application that selectively decodes only those bi-directionally predictable blocks that meet a certain threshold and to discard those bi-directionally predictable blocks that do not meet the threshold. The threshold is dynamically adapted to changing resource levels and to fluctuating input data that occur in a system. An adjusted threshold value based on a first group of pictures (GOP) is used for decoding a second GOP.

In the prior art mentioned above, a threshold value is dynamically set for a scalable module within a decoder system. Estimating the complexity and modifying a method of decoding at the decoder is a delayed reaction. Often, region dropouts occur in essential parts of the picture, resulting in annoying artifacts to the viewer. Moreover, using a threshold value based on a previous GOP to decode a current GOP could result in distortion of unexpected regions in the output picture sequence. In other words, the prior-art method noticeably degrades a video output quality.

It is an object of the present invention to adapt the decoding complexity of a compressed data stream to an available capacity of a video decoder with an improved video output quality.

The object of the invention is achieved in that the modifying means of the device for modifying a compressed data stream as mentioned in the opening paragraphs are arranged to modify a method of decoding indicated in the compressed data stream.

The device proposed by the invention modifies a method of decoding indicated in a compressed data stream. The device estimates the decoding complexity from the compressed data stream. The device is designed to act only when the estimated complexity approaches a capacity available at the decoder. The device has a priori knowledge of the available capacity at the decoder. There are several ways in which the device can acquire this knowledge. The device preferably takes a pre-emptive action when the decoding capacity approaches the complexity. When the complexity estimate approaches a 100% capacity, the device can bring the decoding complexity within limits. For instance, the modification process, preferably the amount of modification for relatively complex parts of an image increases as the complexity gets closer to or exceeds 100% of decoder capacity. This ensures a smooth, gradual and pre-emptive reduction of the decoding load. An optimal picture quality is obtained for a fixed decoder capacity. For any fixed decoder capacity, an optimal picture quality can be obtained under all circumstances and for any compressed data stream.

The decision to modify the compressed data stream can be based on the current picture and the action can be effective on the same picture. As a result, the picture quality at the output is expected to be better than in the prior-art method, in which the decision to modify a current picture sequence is based on the previous picture sequence.

A prior-art modification of the method of decoding at the decoder stage is usually too late and important parts of a picture may be affected. If the decoder is unable to assign resources, blank regions or artifacts will appear in crucial portions of the output picture. It is an advantage of the present invention to bring the decoding complexity of each picture within the available complexity, simultaneously resulting in a better video output quality. An optimum picture quality at the output may be ensured for an available capacity at the decoder.

In a preferred embodiment of the device modifying the compressed data stream, the decoding complexity is based on the computational load or the memory access bandwidth for decoding the picture.

A decoding complexity of encoded video data may be estimated from one or more of a number of values, for example, a number of arithmetic instructions and/or a number of memory read/write operations. These values may in turn be derived directly from a number of parameters available in a compressed data stream, for example, a number of DCT coefficients to be processed, a position of a macroblock in the picture, a reference to (none, single or double) anchor frames and/or a prediction vector length for motion prediction. A decoder may get overloaded particularly due to two values, namely computational load and memory access bandwidth. In a preferred embodiment of the invention, a complexity estimate is derived directly from the compressed data stream. Consequently, modification of the method of decoding indicated in the stream is aimed at a reduction of computational load or memory access.

A preferred embodiment of the device modifying the compressed data stream is characterized in that the modifying means are arranged to select a region on the basis of a heuristic psycho-visual selection criterion and modify a method of decoding for that region.

The device according to the invention is preferably arranged to first select at least one region based on a heuristic psycho-visual selection criterion. It is also possible to select at least one region randomly from the picture so as to simplify the process of selection. However, a selection based on certain heuristic rules is preferred because of the following advantages.

While selecting the regions for modification of the decoding method, psycho-visual criteria can be advantageously applied so that the image quality at the output is not noticeably degraded. A criterion is preferably identified in such a way that artifacts are least annoying to or less noticeable by a visual system model of an observer watching the modified decoded pictures. By applying such a criterion, a number of regions may be chosen so as to minimize the possibility of their distortion being noticed by the human visual system.

A suitable selection criterion is, for example, the proximity of the region to boundaries of the picture.

Distortion of a region at or near the boundaries of a picture is less noticeable to the human visual system as compared to that of a region in the central part of the picture.

A further suitable selection criterion is, for example, the speed of movement of the region.

A motion vector preferably represents the speed of movement of a region. When the motion is fast, i.e. the motion vector is large, distortion in the corresponding regions of movement may be less noticeable as compared to regions having little motion. Thus, regions of fast movement are more suitable for reducing the decoding complexity and may be more advantageously selected for modification of decoding methods as compared to regions of slower movement.

A further suitable selection criterion is, for example, a region representing a complex texture.

Regions with coarse textures are preferable candidates for tolerating relatively more distortion than regions with smooth textures and, hence, they can be preferably selected for modification of the decoding method.

Preferably, the modifying means are arranged to modify a method of motion-compensated prediction of a region of a picture from bi-directional prediction to unidirectional prediction. More preferably, regions selected by applying certain psycho-visual selection criteria are subjected to modification of motion-compensated prediction.

By changing the method of motion-compensated prediction from bi-directional to unidirectional, only a single reference picture needs to be accessed instead of two reference pictures in the case of bi-directional prediction. The memory access for regions to be decoded by applying bi-directional prediction can thus be advantageously reduced Also, the modifying means are arranged to modify a quantized transform coefficient present in the compressed data stream.

A preferred way of modifying a quantized transform coefficient is to render the transform coefficients of higher frequency components to zero. Changing the quantization steps from fine to coarse can alternatively effect modification of transform coefficients. The modification of the quantization step may be implemented as a step change or a gradual change.

The modifying means are preferably arranged to select a region of rectangular shape.

Regular shapes of squares and rectangles conform to MPEG standards, for example, blocks or macroblocks or slices according to MPEG-2 standards. In the device according to a preferred embodiment, macroblocks as specified by MPEG-2 standards can be handled in a particularly efficient manner.

The modifying means are preferably arranged to select a region of a shape that adapts to an object in the picture.

The device is preferably equipped to handle regions of irregular shapes to conform with more recent MPEG standards, for example, MPEG-4 and AVC. In such cases, multiple regions or a single region may correspond to a single object present in the picture. Alternatively, a region may correspond to multiple objects in the picture. This is useful because some regions of a picture get more viewer attention than others. For example, a region comprising a human face receives more attention by the viewer than a region comprising a background.

It is a further object of the invention to provide a video-processing system for compression and decompression of a sequence of pictures, of the type described in the opening paragraphs, which provides a relatively efficient means of adapting the compressed data stream to the available complexity at the decoder. A device according to the invention, in particular in one of the preferred embodiments as set out above, will also be referred to as 'a preparser' hereinafter.

The video-processing system includes a preparser according to the invention for modifying the compressed data stream. The architecture of a decoder does not need to be altered for co-operating with the preparser, resulting in a flexible and efficient system for any number of decoders. A preparser according to the invention and a decoder are separated from each other. A preparser is capable of functioning with or without an input regarding the available load capacity at the decoder. As a consequence, a preparser can be advantageously located at multiple locations. A preparser may form part of a data compressor or of a data decompressor, or it may be located anywhere within a video distribution system, thereby increasing its versatility. A preparser can function in a stand-alone mode or can be integrated within a complete system. A preparser can be realized fully either in hardware, software or any combination of hardware and software.

A video-processing apparatus, capable of one or more of the following types of video-related processing can advantageously include a preparser for:

Video decoding, encoding and transcoding;
Video displaying;
Video recording; and
Video content analysis and content recognition.

A video-processing apparatus may comprise additional units such as" a receiving unit, a processing unit and/or a display unit. A video-processing apparatus may be, for example, a digital television, a set-top box, a personal video recorder, a digital versatile disk (DVD) player or recorder, a Blue-Ray player or recorder, a satellite tuner, head-end equipment of a cable service provider, a video analysis system or a video summarizing system.

The preparser is designed to receive a compressed video stream compatible with e.g. a MPEG or AVC standard and output a compressed video stream compatible with the same standard. Though the stream is modified, it still maintains full compatibility with the standard. In other words, the preparser can be designed to be capable of receiving a compressed video stream from an encoder compatible with MPEG standards and also capable of outputting a compressed video stream to a decoder compatible with MPEG standards. Thus, the preparser may be adapted to work with existing encoders and decoders.

It is a further object of the invention to provide a method defined in the opening paragraphs, which provides a relatively efficient means of adapting a compressed data stream to the available complexity at a decoder.

This object of the invention is achieved in that the step of modifying the compressed data stream comprises modifying a method of decoding indicated in the stream, for example, modification of the reference number referring to the number of anchor frames to be considered while decoding.

These and other aspects of the invention are apparent from and will be elucidated with reference to the embodiments described hereinafter.

These and other aspects of the compressed data stream modifier, the image-processing apparatus, and a method according to the invention are apparent from and will be elucidated with reference to the implementation and embodiment described hereinafter and with reference to the accompanying drawings. The Figures are schematic representations of one of many examples of embodiments of the invention, wherein:

FIG. 1 schematically shows a functional block diagram illustrating components of a general video compression and decompression system.

Figure 2:
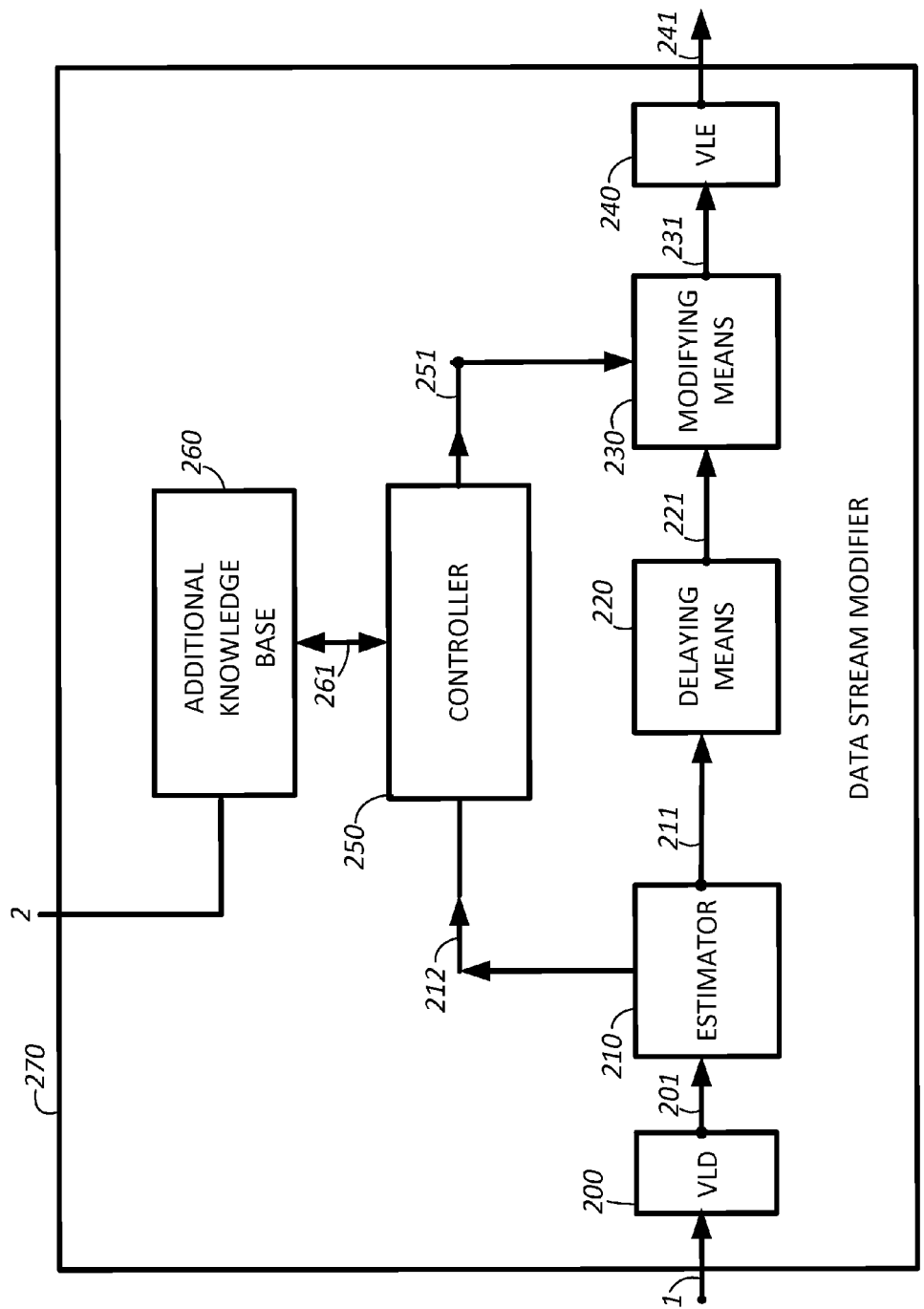

FIG. 2 schematically shows a functional block diagram illustrating components of one example of an embodiment of a compressed data stream modifier according to the present invention.

Figure 3:
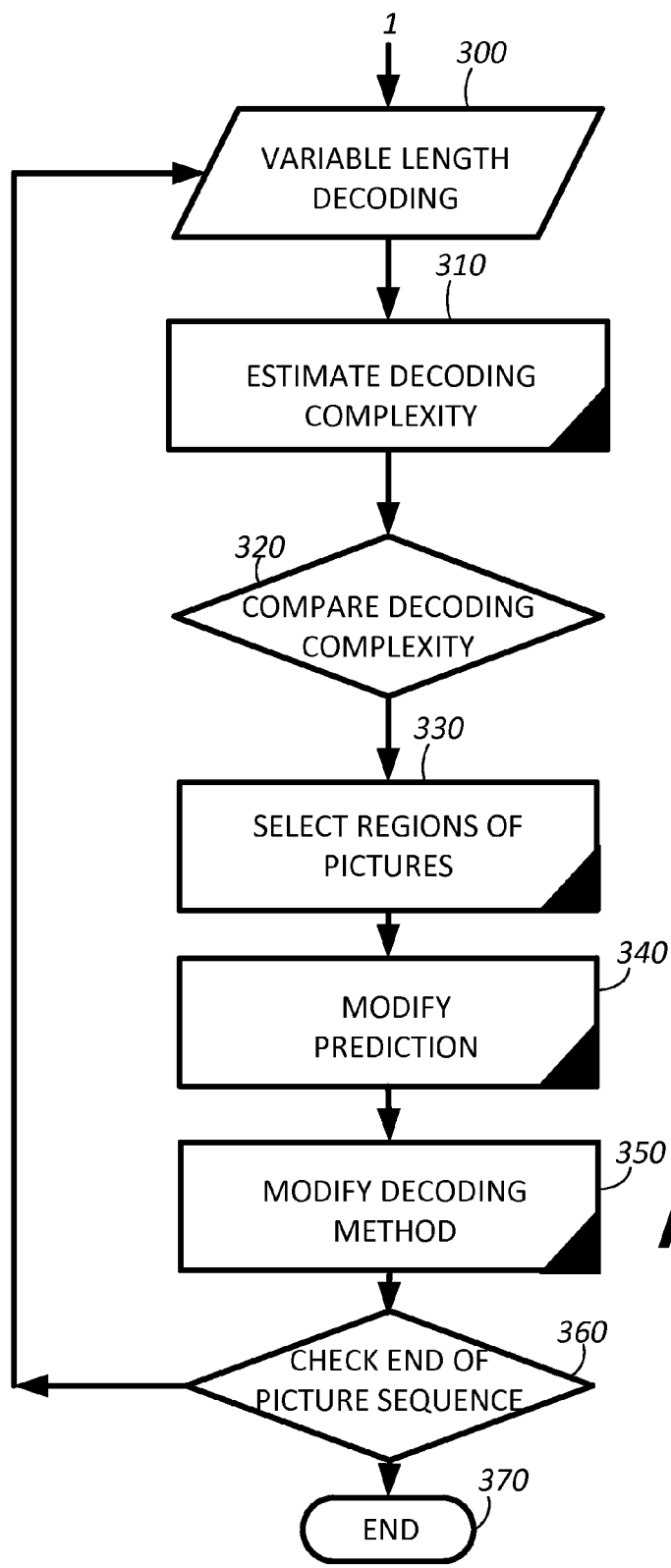

FIG. 3 schematically shows a flow chart illustrating steps of a method of modifying a compressed data stream according to the present invention.

Figure 4:
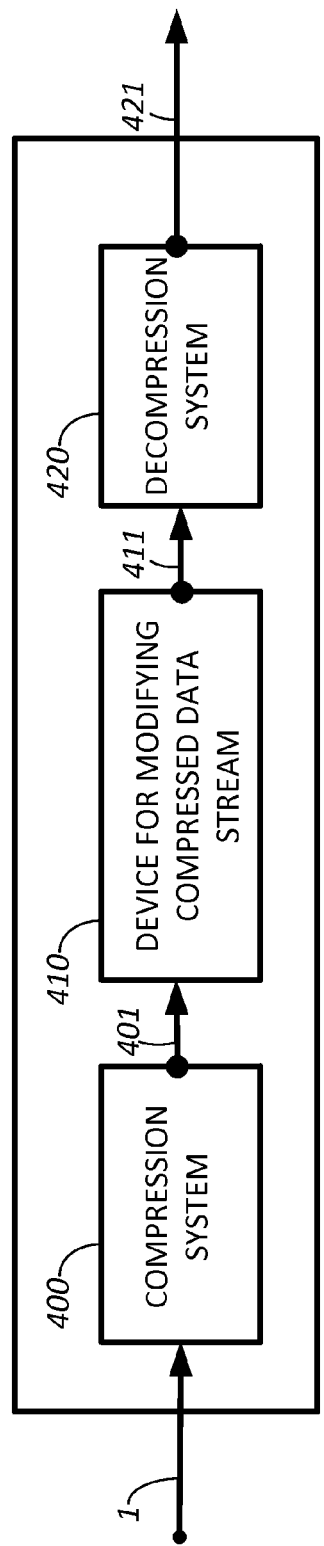

FIG. 4 schematically shows a representation of an embodiment of a video compression system according to the present invention.

Figure 5:
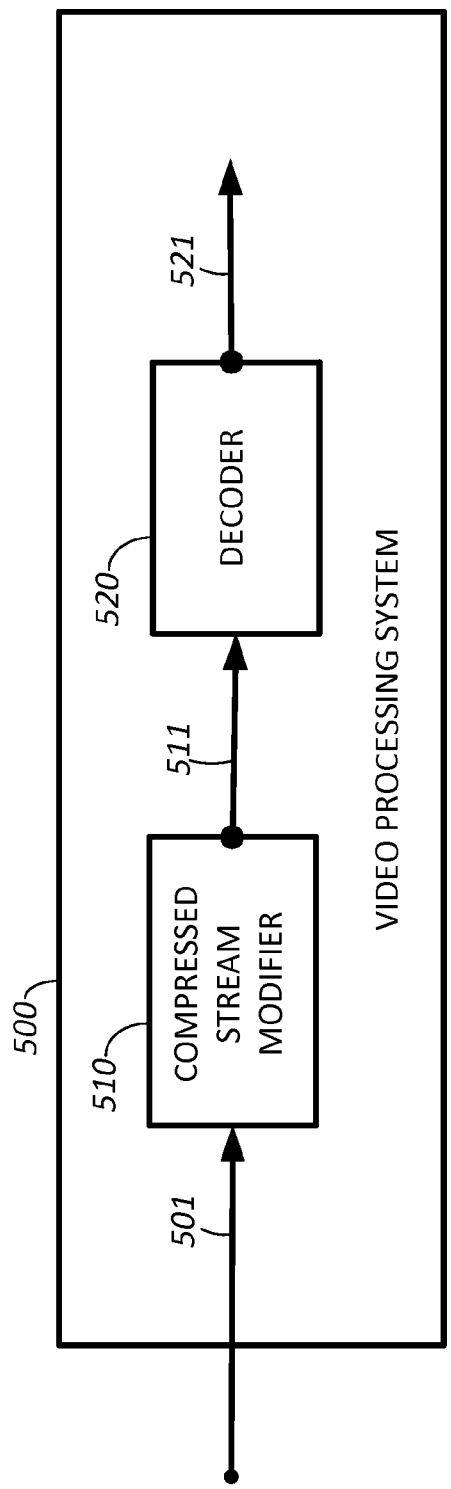

FIG. 5 schematically shows a representation of an embodiment of a video-processing apparatus according to the present invention.

Generally, the present invention relates to devices and methods for dynamically adapting a compressed data stream corresponding to a picture sequence to an available capacity of a decoder. Embodiments of the present invention are capable of analyzing a compressed data stream, estimate a decoding complexity in terms of peak memory and bandwidth requirements and adapt a method of decoding indicated in the stream in order to reduce the complexity of the data stream itself to fall within the capacity available at a decoder. In one of the embodiments, a compressed data stream is modified in such a way that regions of bi-directional pictures can be predicted with a single reference picture, thereby reducing the memory bandwidth by half the original bandwidth. In another embodiment, a method of decoding is modified for a selected set of regions of bi-directional pictures, the selection being made in accordance with a set of psycho-visual criteria of these regions.

FIG. 1 schematically shows a functional block diagram illustrating components of a general video compression and decompression system. A video compression system 110 comprises a video encoder 120. The encoder 120 receives a picture sequence 1 from an external source. The picture sequence can also be generated internally, for example, in DVD players. The output signal 121 of the image compression system comprises a compressed data stream conforming to one of the video compression standards, for example, the MPEG-2 standard. The output signal 121 can be transmitted through a wired or wireless media and received at a video decompression system 130 comprising a decoder 140. The decoder input is a compressed data stream 1 and the decoder output 141 comprises a picture sequence that is substantially similar to the original picture sequence 1.

FIG. 2 schematically shows a functional block diagram illustrating components of one embodiment of a compressed data stream modifier 270 according to the present invention. An input data stream may comprise multiple audio and video data streams. The input stream is first de-multiplexed to obtain a single video elementary stream (ES) by means of well-known techniques. A single video ES can be preferably received and processed by an embodiment of the device according to the invention, as shown in FIG. 2. A video ES conforming to anyone of the well-known video compression standards, for example, MPEG or AVC is received at the input of a variable-length decoder (VLD) 200.

The output of the VLD is a data stream 201 that can be analyzed for estimating a decoding complexity. An estimator 210 estimates a decoding complexity on a frame-by-frame basis from the data stream 201. An estimator of a simple form, for example, can count the number of bi-directionally predicted regions and estimate the memory bandwidth required at the decoder for that particular frame. An estimator of a more complex form can estimate a complexity measure based on a number of parameters, for example, a number of DCT coefficients to be processed, total computational load and memory bandwidth. An estimated complexity value 212 is made available to controller 250. Additional data on predictability of regions and their motion information can be made available to the controller 250. Additional header data available in the data stream, for example, video format, bit rate, quantization levels, field/frame coded, and the number of reference pictures for prediction of each region can also be made available to the controller. The controller can preferably maintain an array for each region of a picture. Elements of this array can preferably relate to various characteristic of the region, for example, its position, motion vector, number of reference pictures, etc. These data can also be used as input to a decision rule based on yet another psycho-visual criterion.

The controller 250 may vary from a simple system to a complex system in a variety of predetermined embodiments of the invention. In an example of a simple embodiment, the controller 250 is equipped to receive an estimate of memory bandwidth, compare it with an available decoder bandwidth, select a number of bi-directionally predicted regions and send the identification of selected regions to a modifying means 230. In an example of a complex embodiment, the controller 250 comprises means for identifying and selecting regions by means of a knowledge-based system. Knowledge in the form of psycho-visual criteria can act upon the data of each region supplied by the estimator 210. Knowledge in the form of rules can be built in the controller 250. Regions are selected in such a manner that the artifacts or distortion due to modification of the method of decoding are less perceptible to the human visual system. Rules can be preferably based on the location of the region in the picture, the speed of movement of the region and/or the texture content of the region. A measure of texture can also be estimated by estimator 210 and made available to the controller 250. Location information of a selected number of regions is conveyed to modifying means 230. It is possible to design and build controller 250 with varying degrees of complexities in terms of amount of data stored for each region, number of rules in the knowledge base, and decision mechanism. In addition, controller 250 can decide upon the method of modification of the data stream and convey this command to the data stream modifier 210. A method of modification of the data stream may be, for example, a change of bi-directional prediction of the region to unidirectional prediction and/or modification of quantized transform coefficients. The output of controller 250 is in the form of command instructions 251 comprising location information of regions selected for modification and method of modification of each region conveyed to a modifying means 230.

An additional knowledge base 260 can have knowledge of the decoding capacities of decoder systems known to the data stream modifier 270. Alternatively, the stream modifier through an external input 2 can receive information regarding the available capacity of a decoder.

The modifying means 230 can also receive a compressed data stream 211, sufficiently delayed by a delaying means 220, for example, a delay line or a memory to compensate for the processing delay in controller 250. Thus, command instructions 251 are automatically synchronized with a time-delayed data stream 221. The modifying means 230 modifies the method of decoding the time-delayed data stream 221 in accordance with the command instructions 251. The modified data stream 231 is received at the input of a variable-length encoder (VLE) 240. The output 241 of the VLE is a modified video ES, fully complying with the compression standards of the original data stream.

In one of the embodiments, estimator 210 estimates the memory bandwidth required for decoding at the decoder. If the bandwidth approaches an available capacity at a decoder, controller 250 will select a subset of regions from a set of 'bi-directionally predicted regions. The controller 250 will further send instructions to the stream modifying means 230 for modifying the method of decoding for the selected set of regions from bi-directional prediction to unidirectional prediction. The memory bandwidth requirements may thus be reduced by as much as half the original bandwidth requirements. Another embodiment stores a set of rules of psycho-visual criteria in the knowledge base 260. The controller 250 may then obtain the applicable rules via link 261 and selects a set of regions for modification of the decoding method, based on the set of these rules. Various other embodiments can be realized by varying the degree of complexity of each components estimator, controller, stream modification means or stream-delaying means and also by combining each or several of these variations thereof.

FIG. 3 schematically shows a flow chart illustrating steps of a method of modification of a compressed data stream according to the present invention. A video elementary stream 1 (ES) corresponding to a sequence of pictures is received in a first step 300 and variable-length decoding according to one of the well-known methods is performed. The decoding complexity of a frame is estimated in step 310. It is compared with a capacity of the decoder in step 320. If the complexity is within the desired limits of the decoding capacity, the stream will not be modified. In that case, steps 330, 340 and 350 are bypassed and the next picture frame will be considered as demonstrated in steps 360 and 300.

If the complexity approaches or overruns the capacity, preventive action in the form of modification of the decoding method will be carried out in steps 330, 340 and 350. In order to avoid a sudden or abrupt loss of quality of output images, corrective action may start, for example, when the complexity estimate reaches 80% of the decoder capacity. The amount of correction needed may gradually increase when the estimated complexity reaches 90% and crosses over to more than 100%. In step 330, regions for which the modification of the decoding method is to be carried out are selected on the basis of one or more psycho-visual criteria. A number of regions are so selected as to bring the decoding complexity within a desired range. A type of modification to be performed is decided in step 340, for example, specifying from bi-directional prediction to unidirectional prediction. The modification of the decoding method is carried out in step 350. The process continues until the end of the picture sequence is reached, which is checked by step 360. The process comes to an end in step 370.

In one of the embodiments, the memory bandwidth needed for decoding at the decoder is estimated in step 310. Then, in step 330, a set of regions of bi-directional pictures for which the method of prediction will be modified from bi-directional prediction to unidirectional prediction is selected. Preferably, in step 330, also a set of psycho-visual criteria such as the proximity of the region to the boundaries of the picture, the speed of movement of the region, the direction of movement of the region and the texture content of the region can be used in deciding for which regions a decoding method should be modified. A number of such embodiments are possible by choosing varying degrees of complexities for each functional step.

FIG. 4 schematically shows a representation of an embodiment of a video compression system according to the present invention, comprising:

A compression system 400 for compressing a sequence of pictures 1;

A device 410 for modifying a compressed data stream; and

A decompression system 420 for decompressing the modified data stream.

The video compression system receives a sequence of pictures and associated audio from a video source. The data compression system 400 reduces the volume of data by encoding the picture sequence by applying well-known techniques. The output of the compression system comprises a compressed data stream 401 conforming to one of the well-known standards, for example, MPEG or AVC. A number of such compressed data streams can be combined to obtain a single data stream.

The video steam modifier 410 according to an embodiment of the invention receives the compressed data stream 401. The data stream 401 according to the MPEG standard can be de-multiplexed by means of a de-multiplexer to obtain an elementary video stream (VS) and an audio stream. The elementary video stream is subjected to modification of the decoding method as described with reference to FIGS. 2 and 3. After modification, the modified compressed data stream 411 preferably still conforms to the standards of the original elementary video stream. The modified data stream 411 can be multiplexed with a corresponding audio stream to obtain the data stream compatible with the original output of the compression system.

The modified data stream 411 can be decompressed by means of a decompression system 420 to obtain a picture sequence 421. The stream modifier 410 can be located at a video distribution system, isolated from the compression or decompression system, for example, at a head-end of a local service provider.

FIG. 5 schematically shows a representation of an embodiment of a video-processing apparatus 500 according to the present invention. A compressed stream modifier 510 according to the present invention receives a signal 501 comprising a compressed data stream and renders an output data stream 511 compatible with the standards of the original data stream 501. The data stream 511 can be decoded at a decoder 520. The output of decoder 520 comprises a picture sequence 521 which may be displayed on a display device. Alternatively, the data stream can be re-transmitted through a wired or wireless distribution system or recorded on a recording media. A compressed data stream modifier according to the invention can be made versatile and located in one of many possible locations to provide video distribution service to an apparatus, for example, at a central computer of a home network or at a head-end of a distribution point of a mobile communication network.

In the claims, use of the verb "comprise" and its conjugations does not exclude the presence of a plurality of elements or steps. In the device claims enumerating several means, several of these means can be embodied by one and the same item of hardware. The invention can be implemented by means of hardware comprising several distinct elements and by means of a suitably programmed computer. In practice, the algorithmic components disclosed in this text may be realized (entirely or in part) as hardware (e.g. parts of an application-specific IC) or as software running on a special digital signal processor, or a generic processor, etc.

A computer program product should be understood to be any physical realization of a collection of commands enabling a processor-generic or special purpose, after a series of loading steps (which may include intermediate conversion steps, such as translation to an intermediate language and a final processor language) to get the commands into the processor to execute any of the characteristic functions of the invention. In particular, the computer program product may be realized as data on a carrier such as a disk or tape or program code on paper. Apart from the program code, characteristic data required for the program may also be embodied as a computer program product.

Some of the steps required for the operation of the method may already be present in the functionality of the processor instead of in the description of the computer program product, such as data input and output steps.

It should be noted that the above-mentioned embodiments illustrate rather than limit the invention. Apart from combinations of elements of the invention as combined in the claims, other combinations of the elements are possible. Any combination of elements can be realized in a single dedicated element.

What is claimed is:

1. A non-transitory computer-readable medium encoded with data and instructions, that when executed by a computer causes the computer to:
   estimate a decoding complexity required for decoding a picture from the compressed data stream; and
   modify the stream when the decoding complexity of the picture approaches a capacity of the decoder, characterized in that modifying the compressed data stream, via the means for modifying, comprises modifying a method of decoding indicated in the stream;
   wherein the modifying is are arranged to select a region on the basis of a heuristic psycho-visual selection criterion and modify a method of decoding for said region.

2. The computer readable medium of claim 1, wherein the decoding complexity is based on a computational load or a memory access bandwidth for decoding the picture.

3. The computer readable medium of claim 1, wherein the selection criterion is a proximity of the region to boundaries of the picture, a speed of movement of the region, or a measure of texture of the region.

4. The computer readable medium of claim 1, wherein the modifying is arranged to modify a method of motion-compensated prediction of a region of a picture from bi-directional prediction to unidirectional prediction.

5. The computer readable medium of claim 1, wherein modifying is arranged to modify a quantized transform coefficient present in the compressed data stream or arranged to select a region of a shape that adapts to an object in the picture.

* * * * *

UNITED STATES PATENT AND TRADEMARK OFFICE
CERTIFICATE OF CORRECTION

PATENT NO. : 8,798,135 B2  
APPLICATION NO. : 13/661778  
DATED : August 5, 2014  
INVENTOR(S) : Vanderheijden et al.

Page 1 of 1

It is certified that error appears in the above-identified patent and that said Letters Patent is hereby corrected as shown below:

Title Page

At Item (62) under "Related U.S. Application Data", delete lines 1 and 2 and insert corrected information as follows:

--Division of U.S. patent application no. 11/722,557, filed on May 15, 2008, now Pat. No. 8,363,714, which is a 371 National Phase of PCT patent application No. PCT/IB2005/054316, filed Dec. 19, 2005, which claims the benefit and priority of European patent application No. 04106886, filed Dec. 22, 2004.--

Signed and Sealed this  
Twenty-fourth Day of May, 2016

Michelle K. Lee  
*Director of the United States Patent and Trademark Office*